(12) United States Patent
Bonadies et al.

(10) Patent No.: US 7,497,883 B2
(45) Date of Patent: Mar. 3, 2009

(54) REFORMER AND METHOD OF USING THE SAME USING DEW POINT TEMPERATURE

(75) Inventors: Joseph V. Bonadies, Clarkston, MI (US); Gerald T. Fattic, Fishers, IN (US)

(73) Assignee: Delphi Technologies, Inc., Troy, MI (US)

( * ) Notice: Subject to any disclaimer, the term of this patent is extended or adjusted under 35 U.S.C. 154(b) by 261 days.

(21) Appl. No.: 11/282,196

(22) Filed: Nov. 17, 2005

(65) Prior Publication Data

US 2007/0107308 A1 May 17, 2007

(51) Int. Cl.
- *C01B 3/36* (2006.01)
- *C10J 3/46* (2006.01)
- *C10J 3/54* (2006.01)
- *F01N 3/20* (2006.01)
- *G05B 1/00* (2006.01)
- *G05B 21/00* (2006.01)

(52) U.S. Cl. .................. 48/197 R; 422/105; 700/266; 700/274

(58) Field of Classification Search ............ 48/197 R; 700/266, 274; 422/105

See application file for complete search history.

(56) References Cited

U.S. PATENT DOCUMENTS

| | | | | |
|---|---|---|---|---|
| 4,242,870 A | * | 1/1981 | Searingen et al. | ............. 60/651 |
| 6,668,544 B1 | * | 12/2003 | Baerts | .......................... 60/277 |
| 2001/0007191 A1 | * | 7/2001 | Ohuchi et al. | .................. 60/284 |
| 2003/0177760 A1 | * | 9/2003 | Posselt et al. | .................. 60/277 |

* cited by examiner

*Primary Examiner*—Alexa D Neckel
*Assistant Examiner*—Matthew J Merkling
(74) *Attorney, Agent, or Firm*—Paul L. Marshall

(57) ABSTRACT

Disclosed herein are fuel reformers utilizing dew point plateau process control and methods of using the same. In one embodiment the fuel reformer can comprise a mixing zone capable of receiving a fuel mixture, a reforming zone disposed downstream from the mixing zone, an exhaust zone disposed downstream from the in operable communication with the reforming zone, a temperature sensor, and a system controller connected in operable communication with the temperature sensor. The temperature sensor can be disposed in fluid communication with the exhaust zone and capable of measuring a gas temperature of the gas stream, or in fluid communication with the mixing zone and capable of measuring a mixture temperature of the fuel mixture. The system controller can be capable of adjusting an operating variable of the fuel reformer and determining a dew point plateau temperature.

4 Claims, 3 Drawing Sheets

REFORMER AND METHOD OF USING THE SAME USING DEW POINT TEMPERATURE

BACKGROUND

Fuel reformers, or fuel processors, are capable of converting a hydrocarbon fuel such as methane, propane, natural gas, gasoline, diesel, and the like, into various lower molecular weight gas streams such as hydrogen ($H_2$), carbon monoxide (CO), carbon dioxide ($CO_2$), methane ($CH_4$), nitrogen ($N_2$), and water ($H_2O$), which can be utilized for many beneficial purposes. Fuel reformers can exist in various configurations to accomplish this function, such as, but not limited to, partial oxidation reformers, steam reformers, dry reformers, plasma reformers, and the like.

Partial oxidation reformers can burn a fuel/oxidant mixture in the presence of a catalyst to produce gas stream, such as, carbon monoxide and hydrogen. The reaction is exothermic and temperatures of about 600° C. to about 1,600° C. (degrees Celsius) are experienced during conversion. Catalysts can be employed which promote accelerated conversion of the fuel into the desired effluent. These catalysts can include, but are not limited to; metals of the alkali, alkali earth, lanthanide series, and transitional metals. An example of the partial oxidation reforming reaction is as follows:

$$CH_4 + \tfrac{1}{2}O_2 \xrightarrow{Catalyst} CO + 2H_2$$

Reformers may be used in multiple applications. One such application is within NOx abatement systems for diesel-powered vehicles. In these applications, reformers can be employed to convert liquid fuel into a gas stream that can serve to regenerate various exhaust treatment devices' catalytic substrates.

Partial oxidation reformers (POx) can comprise a mixing zone and a reforming zone. In the mixing zone, an oxidant and a fuel are mixed to form a fuel mixture, which undergoes combustion and conversion within a substrate to produce the desired gas stream within the reforming zone. During operation, the oxidant and fuel mixture (hereinafter referred to as "fuel mixture") can influence the quality of the gas stream and the reformers' operating conditions, therefore this operating variable is typically controlled during normal operating conditions (steady state conditions). During start-up however, controlling the fuel mixture can be challenging because system sensors are not up to their normal operating conditions, and as a result, closed-loop control is not obtainable. Therefore the fuel mixture can be controlled utilizing calculations based on the reformer's inlet mass air flow-rate and fuel injector pulse width. Unfortunately, inherent measurement errors associated with this method can produce large variations in the fuel mixture, which can produce excessively rich and/or excessively lean conditions. Under excessively rich conditions fuel can pool within the reformer and results in carbon deposition on the internal surfaces of the device, excessively lean conditions can result in high substrate temperatures that result in a decreased working life of the substrate.

Consequently, there is a need for further innovation of fuel reformer fuel mixture control methods that provide enhanced control of the fuel mixture during reformer start-up, without producing conditions conducive to carbon deposition and excessive substrate temperatures.

BRIEF SUMMARY

Disclosed herein are fuel reformers and methods for operating the same.

In one embodiment the fuel reformer can comprise a mixing zone capable of receiving a fuel mixture, a reforming zone disposed downstream from the mixing zone, an exhaust zone disposed downstream from the in operable communication with the reforming zone, a temperature sensor, and a system controller connected in operable communication with the temperature sensor. The temperature sensor can be disposed in fluid communication with the exhaust zone and capable of measuring a gas temperature of the gas stream, or in fluid communication with the mixing zone and capable of measuring a mixture temperature of the fuel mixture. The system controller can be capable of adjusting an operating variable of the fuel reformer and determining a dew point plateau temperature.

In another embodiment, a method for operating a fuel reformer can comprise: combusting a fuel mixture to form a gas stream, wherein the fuel mixture comprises a first air to fuel ratio having a first value; measuring a gas stream temperature; and establishing a dew point plateau temperature having a second value, wherein the establishing of the dew point plateau temperature is based upon the gas stream temperature.

In yet another embodiment, a method for operating a fuel reformer system can comprise: combusting a fuel mixture to form a gas stream, measuring a gas stream temperature, establishing a dew point plateau temperature having a second value, determining a stoichiometric air to fuel ratio from the dew point plateau; and determining a desired air to fuel ratio. The desired air to fuel ratio can be determined using the following formula:

$$(A/F_{Desired}) = \frac{(A/F_{Stoich})(Q_{O_2-Start\text{-}Up})}{(Q_{O_2-Desired})}$$

wherein $(A/F_{Stoich})$ is the stoichiometric air to fuel ratio, $(A/F_{Desired})$ is the desired air to fuel ratio, $(Q_{O_2-Desired})$ is a desired air flow, and $(Q_{O_2-Start\text{-}Up})$ is a start-up air flow.

The above described are exemplified by the following figures and detailed description.

BRIEF DESCRIPTION OF THE DRAWINGS

Referring now to the figures, which are exemplary embodiments.

DETAILED DESCRIPTION

To prolong the working life of a fuel reformer, it desirable to control the fuel mixture supplied to the reformer during start-up conditions. Although the fuel mixture can be calculated using inlet mass air flow measurements, a more accurate system is desired to reduce the potential of inherent measurement error and the effects thereof. Disclosed herein is a method of controlling the fuel mixture during start-up based on measuring the temperature of the gas stream produced during a "dew point plateau". More specifically, a "dew-point plateau" exists for a period of time during device start-up when condensation evaporates from the internal surfaces of the reformer, causing the gas stream temperature to remain constant for a period of time. The temperature reached during the "dew point plateau" is a result of the fuel mixture. If the mixture is adjusted during the "dew-point plateau", the effects on the gas stream temperature can be utilized to control the reformer's operation to about ideal stoichiometric conditions. This control method is referred to as "dew point plateau process control".

Throughout this disclosure specific quantities and ranges will be discussed herein. All ranges disclosed herein are inclusive and independently combinable (e.g., ranges of "up to about 25 wt %, with about 5 wt % to about 20 wt % desired", is inclusive of the endpoints and all intermediate values of the ranges of "about 5 wt % to about 25 wt %," etc). Furthermore, the terms "a" and "an" herein do not denote a limitation of quantity but rather denote the presence of the referenced entity. Also, the modifier "about" used in connection with a quantity is inclusive of the stated value and has the meaning dictated by the context (e.g., includes the degree of error associated with measurement of the particular quantity). The notation "±10° C." means that the indicated measurement may be from an amount that is minus 10° Celsius to an amount that is plus 10° Celsius of the stated value. The suffix "(s)" as used herein is intended to include both the singular and the plural of the term that it modifies, thereby including one or more of that term (e.g., the metal(s) includes one or more metals).

Figure 1:
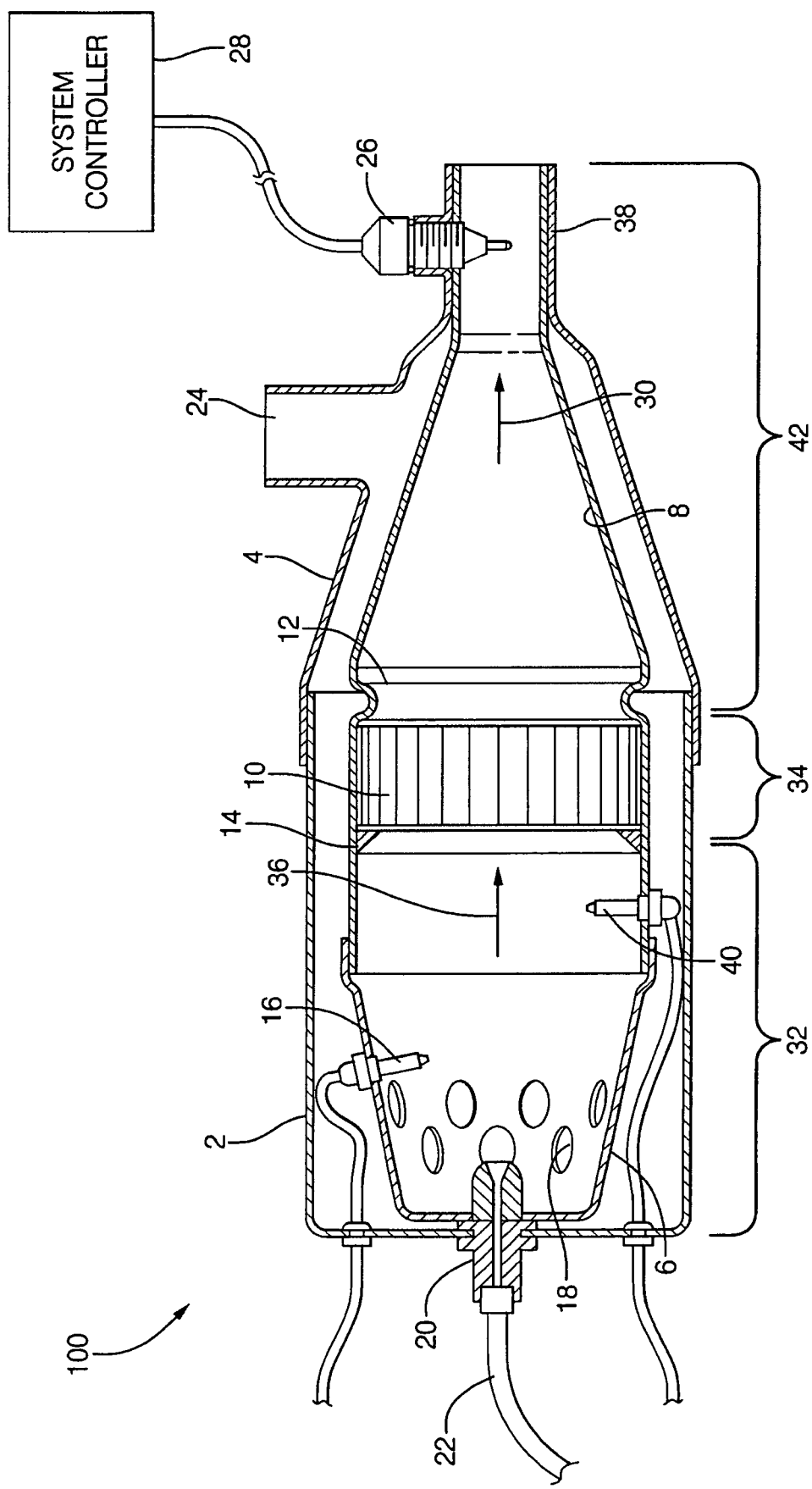
FIG. 1 is a cross-sectional illustration of a fuel reformer with means of dew point plateau process control, generally designated 100.

Referring now to FIG. 1, a partial and cross-sectional view of an exemplary fuel reformer, generally designated 100, is illustrated (hereinafter referred to as reformer 100). Four basic shells can be assembled to comprise the basic structure of reformer 100; rear housing 2, front housing 4, mixing cone 6, and combustion cone 8 (hereinafter referred to as housing components).

Combustion cone 8 and mixing cone 6 can be connected together and share internal volume. Likewise, front housing 4 and rear housing 2 can be connected together to share internal volume. In this configuration, these coaxial volumes are in fluid communication with each other through air inlets 18, which are disposed about mixing cone 6.

The internal volume extending from within mixing cone 6 to about substrate 10 generally comprises a mixing zone 32, the internal volume of substrate 10 generally comprises a reforming zone 34, and the internal volume extending from about substrate 10 to outlet 38 comprises an exhaust zone 42. The internal volume of combustion cone 8 is in fluid communication with outlet 38 and the internal volume of mixing cone 6 through substrate 10. Furthermore, combustion cone 8 supports substrate 10, which is disposed against rib 12 and fixed therebetween by compression ring 14.

Air can be supplied to reformer 100 through air supply port 24, which is in fluid communication with air inlets 18. Fuel can be supplied to reformer 100 through fuel supply line 22 and injected into mixing zone 32 by fuel injector 20, where it mixes with the oxidant flowing through air inlets 18 to form a fuel mixture 36 (air flow rate/fueling rate). Igniter 16 disposed on mixing cone 6 is capable of igniting fuel mixture 36.

Gas stream sensor 26 is capable of measuring the temperature of gas stream 30, and can be connected to outlet 38 in fluid communication with gas stream 30. Gas stream sensor 26 is connected in operational communication with system controller 28, which is capable of interpreting the temperature of gas stream 30 and controlling the fuel mixture 36 supplied to mixing zone 32, e.g., with fuel injector 20 and air supply port 24.

Mixing zone sensor 40 is capable of measuring the temperature of the mixing zone 32 and is in fluid communication with fuel mixture 36. Mixing zone sensor 40 is connected in operational communication with system controller 28, which is capable of interpreting the temperature of fuel mixture 36.

Generally, there are two modes of operation for reformer 100; however additional operating modes can be incorporated if needed. The first mode of operation is start-up. During start up, fuel injector 20 can inject fuel into mixing zone 32 where it can mix with air flowing through air inlets 18 to form fuel mixture 36. Next, igniter 16 can ignite fuel mixture 36, initiating combustion. During start-up, the combustion reaction of fuel mixture 36 is generally contained within mixing zone 32 as the devices substrate 10 increases in temperature. Once substrate 10 has reached temperatures conducive to support reforming of fuel mixture 36 (e.g. about 600° C. to about 1,600° C.), the second mode of operation, steady state reforming operation is initiated. At that point, fuel mixture 36 is adjusted to a rich "reforming mixture" that provides for efficient gas stream 30 production.

During start-up mode, operating conditions vary as temperature and reaction kinetics change. As previously disclosed, it is desirable to control the fuel mixture 36 during this stage of operation in order to avoid excessively lean or rich conditions. This can be achieved through dew point plateau process control, which comprises utilizing measurements of changes in the gas stream 30 temperature as fuel mixture 36 is varied during the dew-point plateau to determine if fuel mixture 36 is at about ideal stoichiometry.

The dew point plateau is a period of time during start-up that the gas stream 30 temperature remains constant as water, which has condensed on the internal surfaces of the device, evaporates. More specifically, during start-up, water is produced by the combustion of fuel mixture 36 and condenses on the internal surfaces of reformer 100 when the temperature of these surfaces are below the dew point temperature for the specific gas stream 30 composition that is produced, which can be about 57° C. As the temperature of reformer 100 increases, the gas stream 30 increases in temperature as well (as a result of the combustion), up to about its dew point temperature. At about this temperature, the water that condensed within the device begins to evaporate. As the water evaporates, heat is removed from the gas stream 30 and the temperature of the gas stream 30 is held to about its dew point temperature for a period of time, creating a temporary stability of the gas stream 30 temperature known as the "dew point plateau".

During the dew point plateau, the resulting temperature of the gas stream 30, as fuel mixture 36 is varied, can be utilized to determine ideal stoichiometry, because when fuel mixture 36 is at ideal stoichiometric conditions, the gas stream 30 temperature will be at a maximum, which creates a maximum dew point plateau. If fuel mixture 36 is adjusted either rich or lean of ideal stoichiometry, the temperature of the gas stream 30 will decrease, creating a lower than maximum dew point plateau. Therefore, once the gas stream 30 temperature has temporarily stabilized during the dew point plateau, fuel mixture 36 can be varied either slightly richer, or slightly leaner, and the resulting temperature can be measured (once, or more than once and averaged) to determine if the adjustment produces a fuel mixture 36 either closer to, or farther from, ideal stoichiometry. For example, if the gas stream 30 is measured at 54° C. and a change to the fuel mixture 36 results in a gas stream 30 temperature of 55° C., the mixture has been adjusted closer to the stoichiometric ideal mixture.

Once all of the condensation has evaporated from reformer 100's internal components and surfaces, the temperature of gas stream 30 is no longer held to about the dew point plateau and can increase. Prior to, or at, this point, dew point plateau process control of fuel mixture 36 can be terminated.

Figure 2:
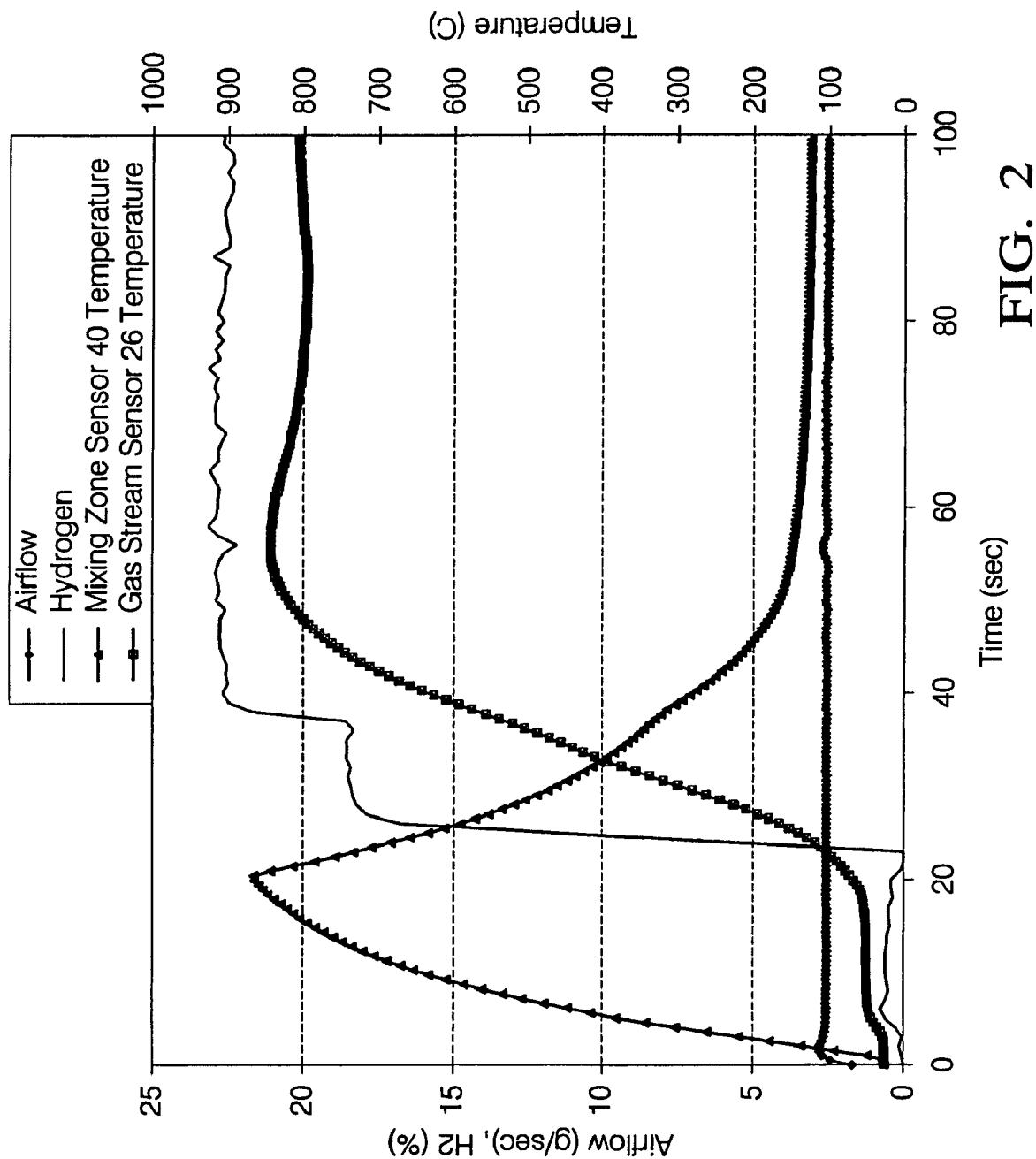
FIG. 2 is a graph illustrating time (in seconds) vs. temperature (in degrees Celsius), airflow (in grams per second), and hydrogen concentration (in percent volume of total gas stream composition).

Referring now to FIG. 2, an exemplary graph plotting various operating conditions of reformer 100 throughout start-up and steady state operating conditions is illustrated. This exemplary graph will serve as a visual aid as the dew point plateau process control method is described. It is noted that the operating conditions and variables disclosed in relation to this specific application are exemplary and are not intended to be limiting. FIG. 2 plots; time (in seconds) vs. temperature (in degrees Celsius), airflow (in grams per second), and hydrogen concentration (in percent of total gas stream 30 composition). The ignition of the reformer initiates at time equal to zero seconds (T=0), and can be estimated as elapsing prior to the point where mixing zone temperature diverges from the gas stream 30 temperature. Approximately three to four seconds after the process is started, the gas stream 30 temperature begins to increase slightly as water condenses on substrate 10 and on the internal surfaces of reformer 100. After approximately five seconds, the temperature of the gas stream 30 begins to level at about its dew point plateau, where it remains for about 13 seconds as water evaporates from substrate 10 and from the internal surfaces of the device. After approximately eighteen seconds from igniting reformer 100, the gas stream 30 temperature begins to increase again because almost all of the condensed water has evaporated. In this exemplary example, the process is changed into steady state reforming operating conditions at approximately 23 seconds after mixing zone temperature reaches approximately 850° Celsius. After steady state operating conditions are initiated, fuel mixture 36 is adjusted to a richer mixture (i.e. "reforming mixture") which provides for efficient gas stream 30 production (e.g. air/fuel ratio of 5:1 for example). During the transition, from about 20 seconds to about 80 seconds, combustion is shifted from within the mixing zone 32 to within the reforming zone 34, which results in an decrease in the temperature of the mixing zone 32, and an increase in the temperature of reforming zone 34.

Figure 3:
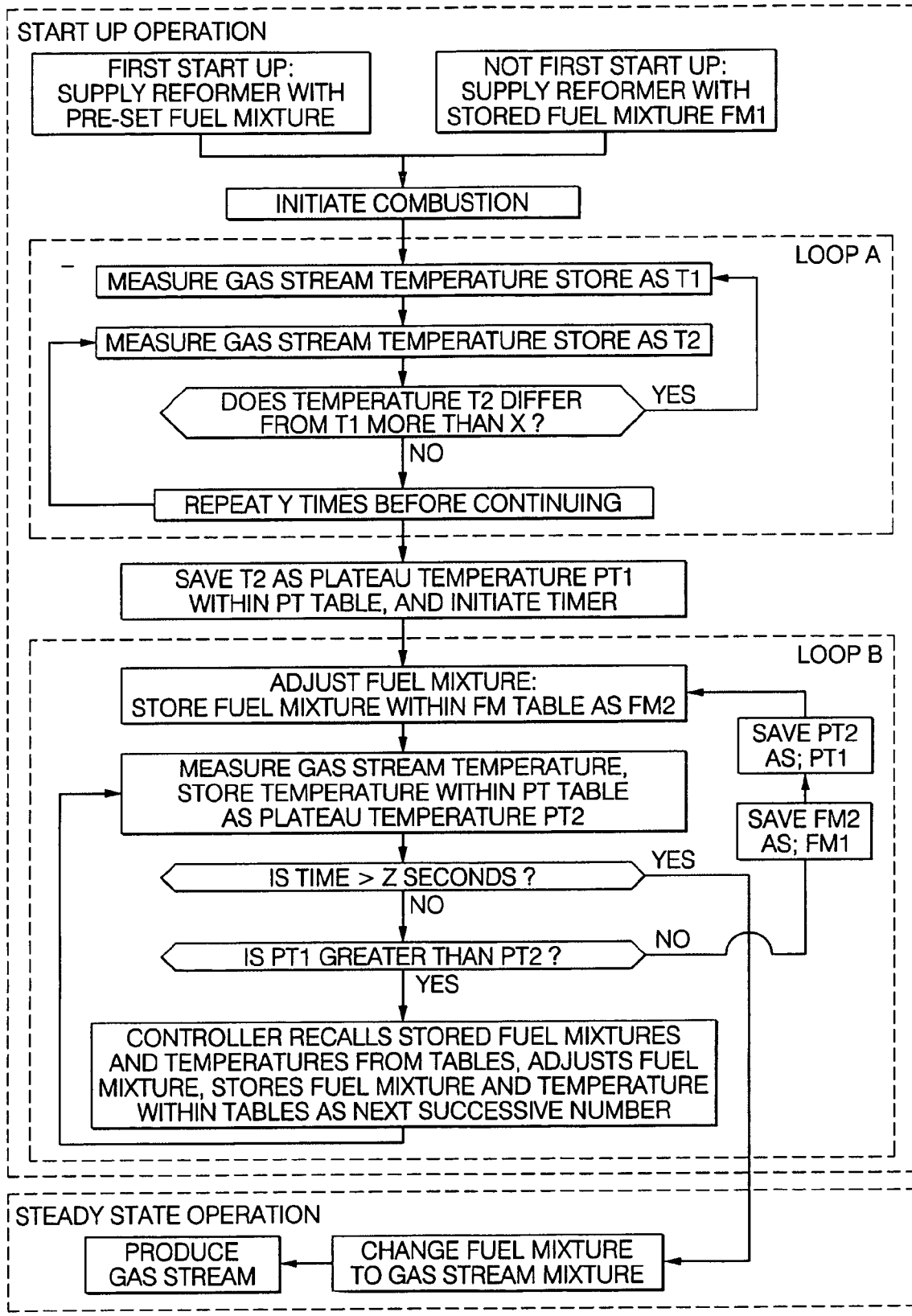
FIG. 3 is an exemplary algorithm for dew point plateau process control.

Referring now to FIG. 3, an exemplary dew point plateau process control algorithm is illustrated. It is envisioned that the algorithm presented is one potential method, of many, for controlling fuel mixture 36 employing dew point plateau process control by system controller 28, and is not intended to be limiting. The algorithm has been illustrated with delineations between start-up operation and steady state reforming operation, and further comprises two loops, loop A and loop B, within the start-up operation boundary. As illustrated, the first time reformer 100 is used a pre-set fuel mixture 36 can be supplied to the device which can be ignited to initiate combustion. After initiating combustion, system controller 28 enters loop A, which can be employed to determine when gas stream 30's temperature has reached its dew point plateau. Although many methods may be used, in the exemplary method this is achieved by first measuring and storing of the temperature of the gas stream 30 as T1. Next, after a period of time, system controller 28 can measure the gas stream 30 temperature again, and store this measurement as T2. System controller 28 can now compare these temperatures; if they differ greater than a predetermined amount, X for example, it is determined that the gas stream 30 temperature has not reached its plateau and loop A is repeated. If the temperatures do not differ greater than the predetermined amount, X, (i.e. the gas stream 30 temperature has reached its dew point plateau) the loop will be repeated for a predetermined number of cycles, Y for example, to ensure the gas stream 30 temperature has reached its dew point plateau. It should be noted that as the gas stream temperature approaches the dew point plateau, the difference in temperature measurements can be measured over time or number of measurements. If the range of temperatures is less than about ±5° C., or more specifically less than about ±3° C., and yet more specifically less than ±1° C., the process can be determined to have reached the dew point plateau, this temperature can thereafter be referred to as the dew point plateau temperature. Furthermore, it is noted that at least two measurements are compared prior to establishing the gas stream 30 temperature has reached its dew point plateau. If this function is satisfied, system controller 28 can save the gas stream 30 temperature, T2, as the first plateau temperature PT1. Within this same step, a timer can be initiated.

After the first plateau temperature, PT1, has been stored and the timer started, system controller 28 enters a second loop, loop B. Loop B can be employed by system controller 28 to evaluate if the system is operating at ideal stoichiometric conditions. This is achieved by measuring the gas stream 30 temperature prior to, and after, a fuel mixture 26 adjustment. If the gas stream 30 temperature increases after a fuel mixture 36 adjustment, the fuel mixture 26 adjustment has brought reformer 100 closer to operating at ideal combustion stoichiometry (hereinafter referred to as stoichiometry). Oppositely, if the gas stream 30 temperature decreases after the fuel mixture 36 adjustment, the system has been adjusted further from operating at ideal stoichiometry. System controller 28 conducts this test by first storing plateau temperature PT1, then adjusting fuel mixture 36 (e.g. a random adjustment, a rich adjustment, a lean adjustment, a calculated adjustment, a predictive adjustment, or the like), storing the adjustment as FM1, and a measuring a second gas stream 30 temperature, which is saved as plateau temperature PT2. Stepping through the sequence of the algorithm, system controller 28 now can test if the timer has exceeded time Z. If so, the system will initiate steady state reforming operating conditions, if not, plateau temperatures PT1 and PT2 are compared. If PT1 is greater than PT2, the adjustment has decreased the gas stream 30 temperature and system controller 28 can recall stored information (e.g. fuel mixture(s), temperature measurement(s), air flow rate(s), and the like) to determine the appropriate fuel mixture 36 adjustment that will be closer to ideal. If PT1 is not greater than PT2, then the fuel mixture 36 adjustment has increased the gas stream 30 temperature, therefore closer to ideal, and FM2 can be saved as FM1, which will be referenced for future start-ups. At this point system controller 28 can continue repeating loop B further optimizing the fuel mixture 36 until time Z is exceeded.

Once time Z is exceeded, system controller 28 can discontinue loop B and initiate steady state reforming operation. System controller 28 can utilize pre-determined set points for operating variables, such as, but not limited to, air flow rate, fuel injection rate, fuel mixture (e.g., FM1), and the like to achieve the desired gas stream 30 mixture (steady state fuel mixture), or more efficiently, calculate the gas stream 30 mixture utilizing stored information during start-up. For example, once a fuel mixture close to ideal stoichiometry has been determined during the start-up phase (e.g., FM1), the steady state reforming fueling rate can be calculated from this value. In one example, the air flow rate and fueling rate, which produces an approximately stoichiometric condition during start-up, can be referenced and utilized to determine the air/fuel ratio (air flow rate/fueling rate) during steady state operation based on a desired air flow rate. This can be represented in the following formula:

$$(A/F_{Desired}) = \frac{(A/F_{Stoich})(Q_{O_2-Start-Up})}{(Q_{O_2-Desired})}$$

Wherein:
$(A/F_{Stoich})$=stoichiometric air to fuel ratio
$(A/F_{Desired})$=desired air to fuel ratio (e.g., reformate air to fuel ratio (such as 5:1)
$(Q_{O_2-Desired})$=desired air flow (e.g., determined to attain a desired reformate flow rate)
$(Q_{O_2-Start-Up})$=start-up air flow It is envisioned that system controller 28 is capable of executing the exemplary algorithm presented in FIG. 3 utilizing gas stream sensor 26 to measure the gas stream 30 temperature. The system controller 28 can be any device capable of these functions, such as, but is not limited to, a processor(s), computer(s), and so forth, and can employ memory, storage, register(s), timing, interrupt(s), communication interfaces(s), input/output signal interface(s), and so forth, as well as combinations comprising at least one of the foregoing. Furthermore, the system controller can include input signal processing and filtering capabilities that enable accurate sampling and conversion of acquisitions of such signals from various sensor(s). For example, an "on/off" controller, proportional controller, and/or a proportional-integral-derivative controller (e.g. with advanced "fuzzy-logic" capabilities), and the like can be employed.

In addition to the system controller 28, sensor(s) and other equipment can be employed in operable communication with the system controller enabling its function, such as thermocouple(s), probe(s), transducer(s), cell(s), meter(s), switch (es), and so forth, as well as combinations comprising at least one of the foregoing. This equipment can assist in controlling operating variable(s), component(s), and condition(s) of reformer 100, such as the fuel mixture 32, the oxidant flow rate, the temperature, the fuel pump speed, the injector pump pressure, the injector pump pulse width, and so forth, as well as combinations comprising at least one of the foregoing.

Moreover, system controller 28 can initiate dew point plateau process control at any point and terminate control at any point and is not limited by the exemplary algorithm. For example, system controller 28 can command control of reformer 100 to initiate dew point temperature control based on sensor feedback (e.g. ignition, temperature, flow rate, gas stream production, and so forth), or as a result of pre-set conditions (e.g. programs, time, and so forth), as well as feedback combinations comprising at least one of the foregoing. In the exemplary embodiment in FIG. 2, it is envisioned that the program controller 28 initiates dew point temperature control when a minimum temperature is measured by gas stream sensor 26, of about 50° C. for example. It is also envisioned that program controller 28 can terminate dew point temperature control once a pre-set value is reached by gas stream sensor 26 and/or mixing zone sensor 40, which can be 850° C. for example, at which point steady state reforming operation can be initiated.

In the exemplary illustration, any sensor capable of measuring the temperature of the gas stream 30 can be employed as gas stream sensor 26 and mixing zone sensor 40. More specifically, type B, type C, type R, and/or type S thermocouples capable of withstanding temperatures of up to about 1000° C. will suffice. High temperature applications can be configured that employ sensors capable of withstanding temperatures of up to about 1600° C. Furthermore, as illustrated, gas stream sensor 26 is connected to outlet 38 and extending into combustion cone 8 in fluid communication with gas stream 30. Also, mixing zone sensor 40 is connected to combustion cone 8 and extends into the mixing zone 32 in fluid communication with fuel mixture 36. It is understandable that the position of gas stream sensor 26 and mixing zone sensor 40 can influence the accuracy and precision of measurement. Therefore, one or more sensors can be utilized and positioned as needed to enhance the accuracy and precision of the measurement(s).

Substrate 10 functions to store enough heat from the reformer's exothermic reaction to support the steady state combustion of the fuel mixture 36 and provide a large surface area to promote a catalytic reaction between the products of combustion and the catalysts on the substrate 10.

Substrate 10 can comprise, materials such as, but is not limited to, cordierite, silicon carbide, mullite, titanium oxides, titanium phosphates, aluminum oxides (alpha-aluminum oxides), aluminates (lanthanum aluminate, lanthanum hexaaluminate, zirconia toughened aluminate (ZTA)), alumino silicates, aluminum phosphates, aluminum titanates, zirconium oxides, zirconium phosphates, lanthanum zirconate, magnesium silicates, stabilized versions of the preceding, and combinations comprising at least one of the foregoing. Disposed on and/or in the substrate is a reforming catalyst comprising a metal(s), such as, but not limited to, platinum, iridium, cerium, ruthenium, rhodium, cobalt, iron, osmium, palladium, tantalum, zirconium, yttrium, cerium, nickel, manganese, copper, and the like, as well as oxides, salts, or alloys as well as combinations comprising at least one of the foregoing.

Generally, reformer 100 can be cylindrical with a circular in cross-sectional design. However these components may be configured in any geometry that is effective. Materials that can be employed for the construction of combustion cone 8, mixing cone 6, front housing 4, and rear housing 2, are preferably metals capable of withstanding a long service life enduring temperatures of up to about 1,600° C. and temperature cycling of about 0° C. to about 1,600° C. Moreover, materials capable of resisting the internal combustion environment and the external conditions experienced during use (e.g. sand, road salt, water, etc.) are desirable. Applicable materials can be, but are not limited to, ferrous metals, ferritic stainless steels (e.g. marensitic, ferritic, and austenitic stainless materials, and so forth), and so forth.

Reformer 100 can operate using various reactants to produce various gas stream 30 compositions. Diesel fuel can be used in many applications, as it is readily available in vehicles employing reformer assisted NOx abatement systems. However, other hydrocarbon-based fuels can be converted as well, such as, gasoline, ethanol, methanol, kerosene, diesel blends, and the like; gaseous fuels, such as natural gas, propane, butane, naphtha's, and the like; and alternative fuels, such as hydrogen, biofuels, dimethyl ether, ethanol, and the like; as well as combinations comprising at least one of the foregoing fuels.

Oxidants supplied to the reformer 100 can comprise, air, pure oxygen, recirculated exhaust gas, and the like, as well as combinations comprising at least one of the foregoing. The oxidant supplied to reformer 100 can be heated prior to mixing with the fuel. Any methods may be employed, such as, but not limited to, passing air supply through a heat exchanger, utilizing electrical heating elements, and the like. In addition, a pump, compressor, turbine, fan, or the like can be utilized to pressurize the oxidant, fuel, and/or the fuel mixture 36 if required, and sensors such as flow sensors, temperature sensors, pressure sensors, and the like may be employed to adjust, monitor, and/or control the air supplied to the reformer to maximize efficiency.

A method for controlling fuel mixture 36 during reformer start-up has also been developed. This method offers enhanced control that can result in decreased carbon deposition and a reduction in excessive substrate temperature events, resulting in increased working life of reformer 100 and enhanced fuel efficiency.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or element to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for operating a fuel reformer system at a desired air flow of $(Q_{O_2\text{-}Desired})$ comprising the steps of:
   (A) combusting a fuel mixture stream comprising air and fuel to form a gas stream, wherein the fuel mixture stream has an air to fuel ratio having a first value and an initial air flow rate of $(Q_{O_2\text{-}Start\text{-}Up})$;
   (B) establishing a stoichiometric air to fuel ratio $(A/F_{Stoich})$ by:
   (1) measuring temperature of the gas stream until it reaches a dew point plateau temperature having a second value;
   (2) changing the air to fuel ratio of the fuel mixture stream to a third value;
   (3) measuring the gas stream temperature until it reaches a dew point plateau having a fourth value;
   (4) comparing the fourth value to the second value;
      (a) if the fourth value is less than the second value, then establishing the second value as the stoichiometric air to fuel ratio $(A/F_{Stoich})$;
      (b) if the fourth value is greater than the second value, resetting the first value to a number equal to the third value, resetting the second value to a number equal to the fourth value, and repeating steps (B)(2)-(B)(4) until step (B)(4)(a) is satisfied; and
   (C) controlling the air to fuel ratio to a desired air to fuel ratio, $(A/F_{Desired})$, according to the following formula:

$$(A/F_{Desired}) = \frac{(A/F_{Stoich})(Q_{O_2\text{-}Start\text{-}Up})}{(Q_{O_2\text{-}Desired})}.$$

2. The method of claim 1, wherein the establishing of the dew point plateau temperature comprises evaluating the gas stream temperature over time, wherein if the gas stream temperature fluctuates less than or equal to ±5° C. over a minimum of two measurements, then the gas stream temperature is the dew point plateau temperature.

3. The method of claim 2, wherein the fluctuation is less than or equal to ±3° C.

4. The method of claim 1, wherein the fluctuation is less than or equal to ±1° C.

* * * * *